(12) United States Patent
Hamrick (10) Patent No.: US 6,373,145 B1
(45) Date of Patent: Apr. 16, 2002

(54) RAM AIR ELECTRICAL GENERATOR/ CHARGING SYSTEM

(76) Inventor: Dennis E. Hamrick, P.O. Box 7611, Capistrano Beach, CA (US) 92624

( * ) Notice: Subject to any disclaimer, the term of this patent is extended or adjusted under 35 U.S.C. 154(b) by 0 days.

(21) Appl. No.: 09/477,635

(22) Filed: Jan. 5, 2000

Related U.S. Application Data (63) Continuation-in-part of application No. 09/309,193, filed on May 10, 1999, now abandoned.

(51) Int. Cl.[7] ............................... F03D 9/00; H02P 9/04
(52) U.S. Cl. .............................. 290/44; 290/42; 290/53; 290/54; 290/55
(58) Field of Search .............................. 290/42, 43, 44, 290/54, 55

(56) References Cited

U.S. PATENT DOCUMENTS

| | | | | |
|---|---|---|---|---|
| 3,556,239 A | * | 1/1971 | Spahn | 290/54 |
| 4,075,545 A | * | 2/1978 | Haberer | 320/61 |
| 4,254,843 A | * | 3/1981 | Han et al. | 180/165 |
| 4,314,160 A | * | 2/1982 | Boodman et al. | 290/55 |
| 5,287,004 A | * | 2/1994 | Finley | 290/545 |
| 5,296,746 A | * | 3/1994 | Burkhardt | 290/55 |
| 5,584,355 A | * | 12/1996 | Burns | 180/165 |
| 5,680,032 A | * | 10/1997 | Pena | 290/54 |
| 5,760,515 A | * | 6/1998 | Burns | 310/115 |
| 6,097,164 A | * | 8/2000 | DeRosa | 318/139 |

* cited by examiner

Primary Examiner—Elvin Enad
(74) Attorney, Agent, or Firm—James G. O'Neill (57) ABSTRACT

An electrical power generator/charging system for an electrical vehicle includes an alternator system to recharge one or more battery packs, while providing electricity to a propulsion motor when the vehicle is moving or stopped after having moved, and also maintains the maximum voltage to the electrical propulsion motor as the vehicle is driven. Specifically shaped air ducts ram air through impellers, held in reduced diameter housings, to efficiently drive a number of pulleys and belts to turn alternators at various speeds. The system includes a flywheel for use during slowing down/stopping of the vehicle, and a pulley having a freewheel/gear-changing unit to enhance the overall efficiency of the electrical generating/charging system at practically any speed. By-pass channels may be formed around the reduced-diameter housings to control air pressure in front of the impellers.

16 Claims, 10 Drawing Sheets

RAM AIR ELECTRICAL GENERATOR/CHARGING SYSTEM

CROSS REFERENCE TO RELATED APPLICATION

This is a continuation-in-part of copending application Ser. No. 09/309,193, entitled RAM AIR ELECTRICAL GENERATOR/CHARGING SYSTEM, filed May 10, 1999 now ABN.

BACKGROUND OF THE INVENTION

1. Field of the Invention

This invention relates generally to electrically powered vehicles, and more particularly, to an improved ram air electrical generator/charging system for powering the motor and recharging the battery packs in such vehicles.

2. Description of Related Art

Many types of charging or generator systems for electrically powered vehicles are known. Examples of such known devices are set forth in U.S. Pat. Nos. 3,444,946 to Waterbury, 3,713,503 to Haan, 3,878,913 to Lionts et al., 4,075,545 to Haberer, 4,141,425 to Treat, 5,296,746 to Burkhardt, 5,680,032 to Pena, 5,850,108 to Bernard, 4,423,368 to Bussiere, 4,282,944 to Trumpy, 4,179,007 Howe, 4,168,759 to Hull et al., 3,621,930 to Dutchak, 3,876,925 to Stoeckert, 4,132,282 to Sparks and Des.374,656 to Richardson.

These known patents provide improvements in the art, but do not provide a simple and easy-to-use system which works efficiently in all situations, and which increases the efficiency of the generating system, such as the ram air electrical generator/charging system of the present invention.

There, therefore, exists a need in the art for an inexpensive and efficient power source for electric vehicles, which incorporates an electric power generating device to create electric power as a vehicle moves, and which recharges one or more battery packs held in the vehicle during propulsion or when the vehicle comes to a stop, and which, at the same time, maintains the maximum voltage possible in and to the electrical propulsion motor.

The creation of an inexpensive and efficient power source for electric vehicles, such as automobiles, has been a challenge for many years. The present invention overcomes the known problems with existing technology by incorporating an electrically powered generating/charging device into a battery/electrically powered vehicle, and allows the moving vehicle to be its own power generating source. The improved device of the present invention will help keep the overall costs of vehicle ownership down, and dramatically cut air pollution.

SUMMARY OF THE INVENTION

Accordingly, it is a general object of the present invention to provide an improved and simplified on-board electrical generating system for an electrical vehicle. It is a particular object of the present invention to provide an improved and simplified ram air electrical generator system, which creates electrical power as a vehicle moves forward so as to recharge one or more battery packs held within the vehicle. It is another particular object of the present invention to provide an improved and simplified ram air electrical generator/charging system, which will continue to charge battery packs in a vehicle when the vehicle comes to a stop, and which also maintains the maximum voltage possible to the electrical propulsion motor of the vehicle, as the vehicle is driven. It is yet another particular object of the present invention to provide an improved and simplified ram air electrical generating/charging system, which delivers a peak flow of electricity to a battery pack while the battery pack is delivering electrical power to the motor of an electrical vehicle, and which provides peak voltage at high-rates of speed. And, it is still a further particular object of the present invention to provide an improved and simplified ram air electrical generating/charging system having a by-pass channel to allow excess airflow to be routed around an impeller to minimize drag forces.

These and other objects and advantages of the present invention are achieved by providing an electrically powered vehicle, having at least one specifically designed air intake duct at the front or rear of the vehicle, whereby air flows through the duct and is forced through an impeller held in a constricted orifice, and which impeller is connected to a drive shaft. The drive shaft includes a drive pulley mounted thereon connected via a belt to a forward driven pulley/freewheel/gear-change combination unit mounted on a main drive shaft. The main drive shaft also includes an aft-driven pulley, which is integrated with a flywheel to allow the main drive shaft to maintain the highest possible rotational speed as the vehicle slows or stops for any reason. The aft-mounted pulley is connected to two electrical alternators to charge the battery system of the vehicle. The flywheel is included in the system to keep the generator side of the system moving at faster speeds during slowing or stopping of the vehicle. The freewheel is coupled to the flywheel, and includes a gear system, which will shift the device up or down to an efficient gear ratio, depending on the speed of the vehicle. One or more by-pass channels may be located circumferentially around a restrictor to allow airflow to be routed around the impeller when air pressure behind the restrictor chamber reaches a designed operating point. Other devices, such as a power regulator, a computer control monitor, gear change actuator and a housing for the overall device are included.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

Figure 7:
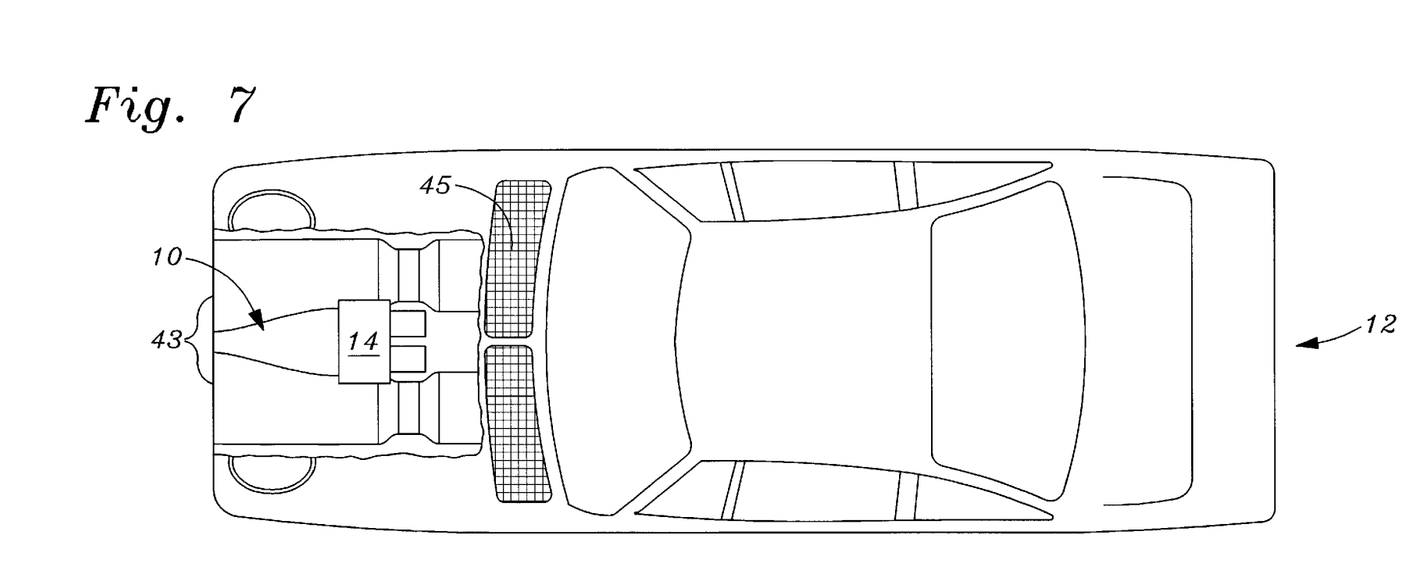
FIG. 7 is a top elevational view of a preferred embodiment of an electrically powered vehicle containing the ram air electrical generator charging system of the present invention.
Figure 8:
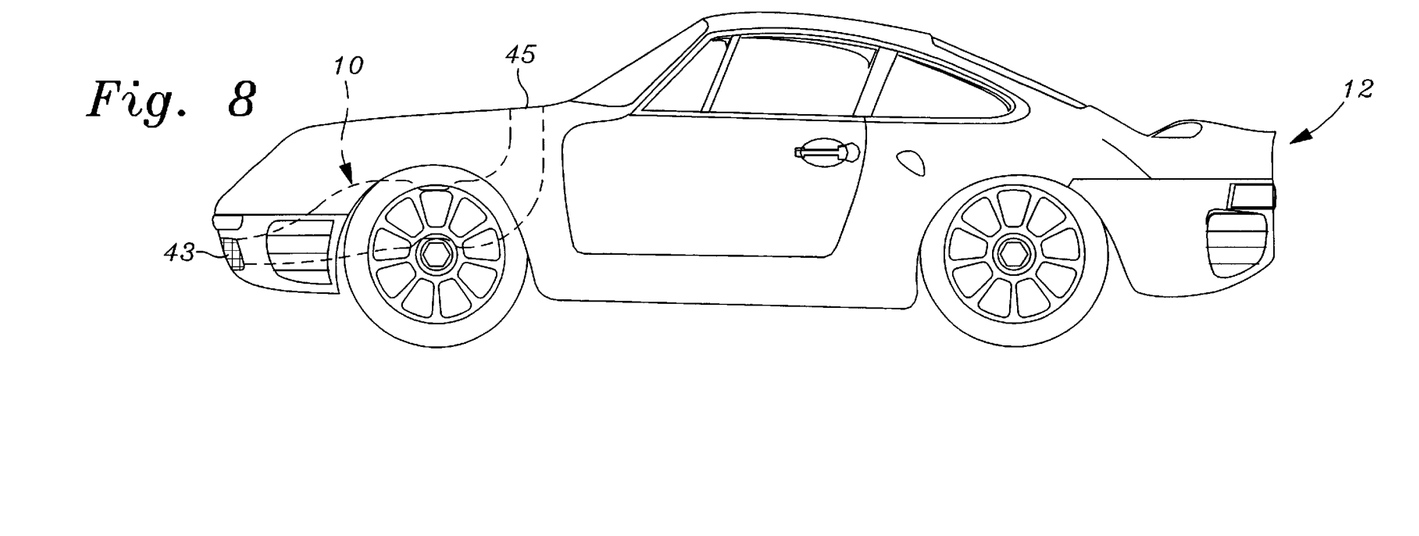
FIG. 8 is a side elevational side view of the vehicle of FIG. 7.
Figures 9A, 9B:
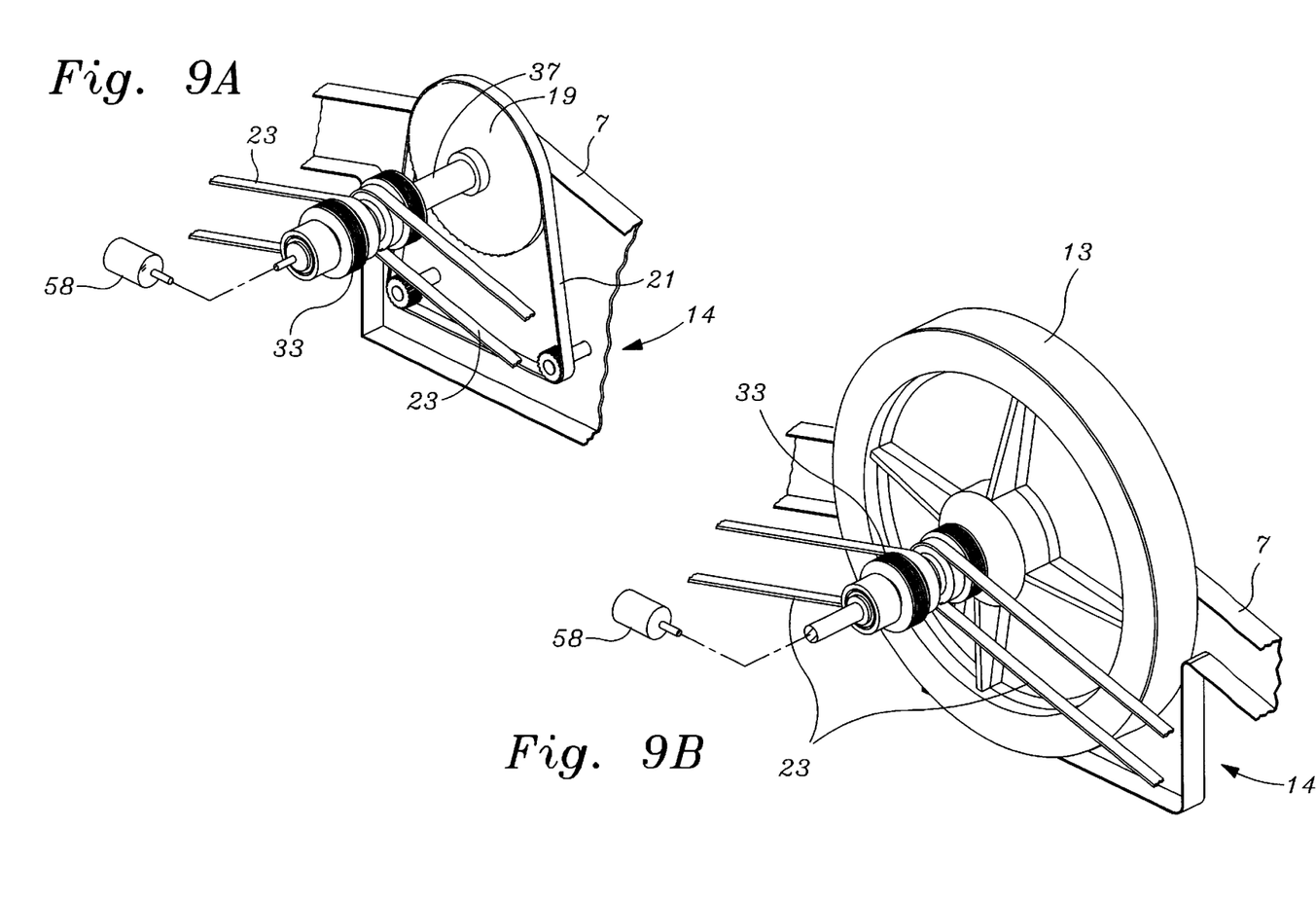
FIG. 9A is a partial perspective top view of a main shaft, aft mounted pulley and belt, forward driven pulley/ freewheel/gear charge combination unit and belts, and gear charge actuator, without the flywheel, of the ram air electrical generator/charging system of the present invention.
FIG. 9B is a partial perspective top view of the main shaft, as shown in FIG. 9A, with the flywheel added.
Figure 10:
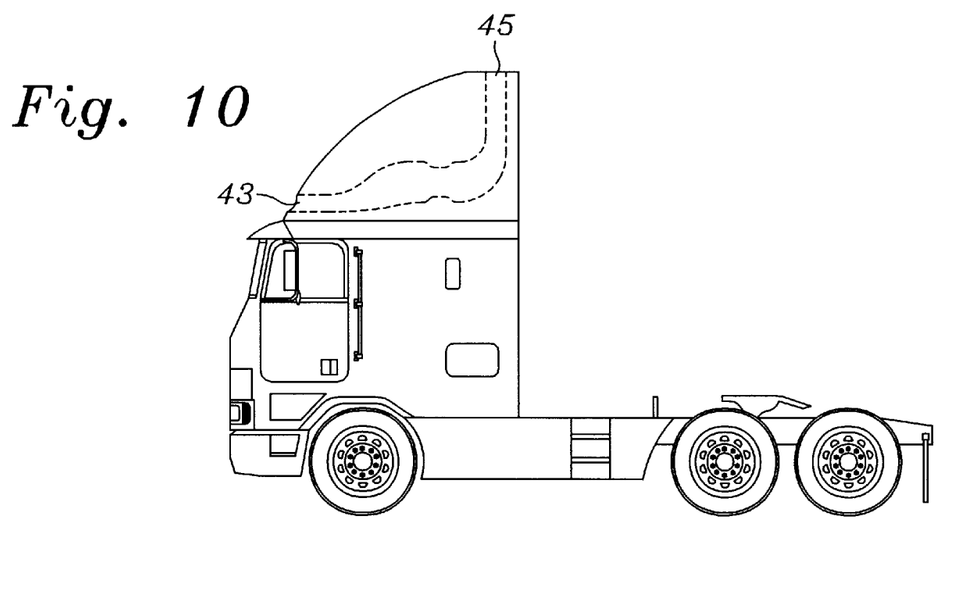
FIG. 10 is a side elevational view of a hybrid diesel electrically powered truck containing the ram air electrical generator/charging system of the present invention.
Figure 11:
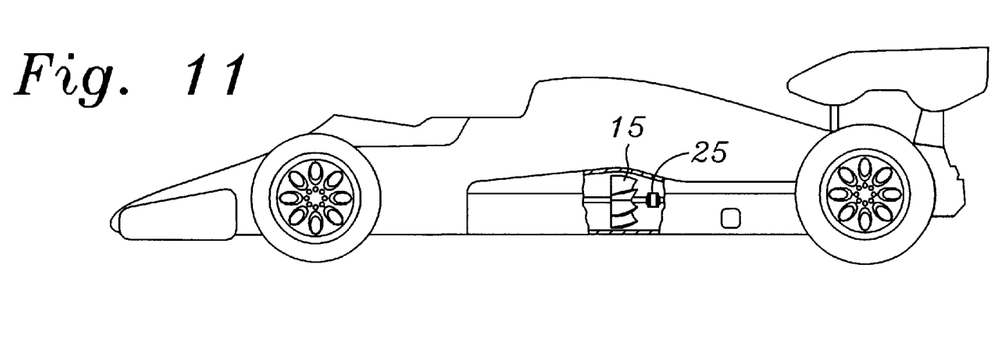
FIG. 11 is a side elevational view of a further racing vehicle having the ram air electrical generator/charging system of the present invention therein.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved and simplified ram air electrical generator/charging system 10 for creating inexpensive and efficient power carried on board electrically powered vehicles. The system 10 is design to fit into substantially any electrically driven vehicle 12, such as an automobile shown in FIGS. 7 and 8, a truck shown in FIG. 10, or a race car, as shown in FIG. 11.

As best shown in FIGS. 1–5, 9A and 9B, the improved ram air electrical generator/charging system of the present invention includes a central housing 14 having a front plate 5, a rear plate 7, a bottom plate 9 and a top plate 11. On either side of the housing assembly 14 there are provided a pair of specifically shaped ram air ducts 41 consisting of a pair of matched inlet openings 43, restrictors 16 and exhaust or outlet openings 45. Furthermore, mounted to the rear plate 7 and operatively connected to an internal operating system within the housing assembly 14, are a pair of electrical alternators 17 for generating electricity and charging one or more battery packs or a battery system 50, described more fully below.

Adjacent the housing assembly 14, or in extending arm portions thereof, are mounted a pair of impellers 15 on impeller drive shafts 35, supported by a pair of bearings 29. Each of the drive shafts 35 also includes a drive pulley 25 rotatably connected thereto, which drive pulleys 25 drive belts 23 so as to turn or drive a forward driven pulley/ freewheel/gear-changing combination unit 33 mounted on a main drive shaft 37. The main drive shaft 37 includes the forward driven pulley/freewheel/gear-change combination unit 33, a flywheel 13 and an aft driven pulley 19. The main drive shaft is also preferably supported by a pair of bearings 31. The aft-mounted driven pulley 19 is connected by a belt 21 to the two electrical alternators 17, to drive the same.

An explanation of how one embodiment of the present invention operates will now be given. As one drives an electrical powered vehicle 12, air flows into an inlet opening or portion 43, preferably mounted in the front of the vehicle, but which could also be mounted in the rear of the vehicle. The air then flows down or through the intake or inlet ducts 41, around a faring 39, held over the extending arm portions of the housing 14, within the intake ducts 41. The impellers 15 are preferably engineered so as to be shaped, sized and dimensioned to most efficiently capture and utilize the energy of the air. These impellers 15 are also designed for minimal aerodynamic drag, and are held within reduced diameter cylindrical housings or flow restrictors 16, on each side of the housing 14. That is, air flowing into ram air ducts 41 is more efficiently forced or rammed through the flow restrictors and shaped impellers 15 to thereby transfer the maximum amount of energy to rotate the impellers and the impeller drive shafts 35. Upon rotation of the drive shafts 35, the drive pulleys 25 and belts 23 will rotate the forward driven pulley/freewheel/gear-change combination unit 33, mounted on the main drive shaft 37. Depending on the actual condition or state of the unit 33, as determined by a computer control system 55, the main drive shaft 37 will be rotated, to thereby rotate the flywheel 13 and the aft-driven pulley 19. It is to be understood that, in some instances, the forward driven pulley/freewheel/gear-change combination unit 33 shifts up or down and/or allows the unit to freewheel, thereby allowing the main drive shaft 37 to maintain the highest rotational speed. For example, as the vehicle slows for traffic or comes to a complete stop, a gearshift actuator 58 would shift the gear down, or conversely, as a predetermined increasing rotational speed is reached, the gearshift actuator will shift the gear up, allowing the flywheel and generators to spin at a higher speed. The rotation of the aft mounted pulley 19 drives belt 21 to drive the two electrical alternators to generate electricity to power the motor of the vehicle and/or to charge the battery pack 50 during operation of the vehicle.

The gear change unit, part of item 33, is constructed internally of this item, and consists of several gear ratios that are selectable, depending upon the current rotational speed of shafts 35 and 37.

The proper ratio will be determined by the calculation of various data provided to the computer control 55 through several rotational sensors located on both sides of the freewheel unit 33. These sensors (not shown) will send rotational data to computer control 55, which computer control will determine the proper ratio and send output to the gearshift actuator 58 that will function to select the proper ratio.

When the vehicle slows down, the energy of the flywheel will keep the generator side moving at a faster speed, to allow the electrical alternators 17 to continue to charge the one or more battery packs 50. Additionally, the freewheel coupling built into the forward pulley unit 33 will allow the shaped impellers 15 to freewheel to reduce drag on the device, while at the same time, the gear system therein will be shifted downwardly to a lower ratio, by means of the computer control 55, which positions gearshift actuator 58.

Figure 12A:
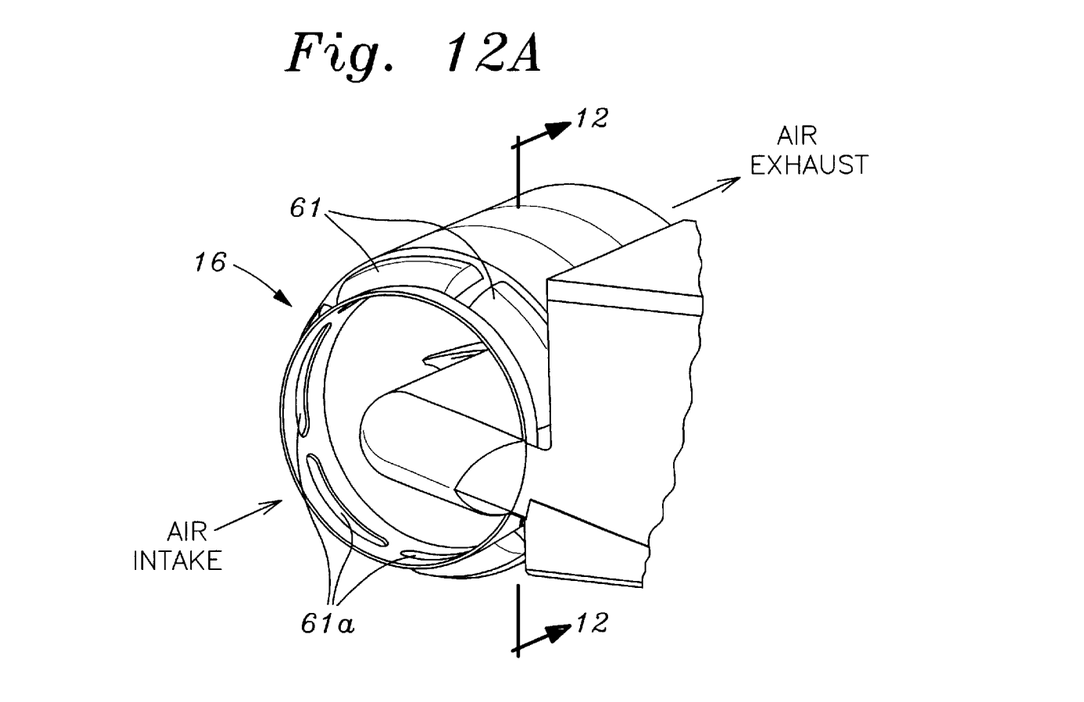
FIG. 12a is a partial front perspective view of a restrictor housing showing one or more by-pass channels having one or more intake orifices.
Figure 12B:
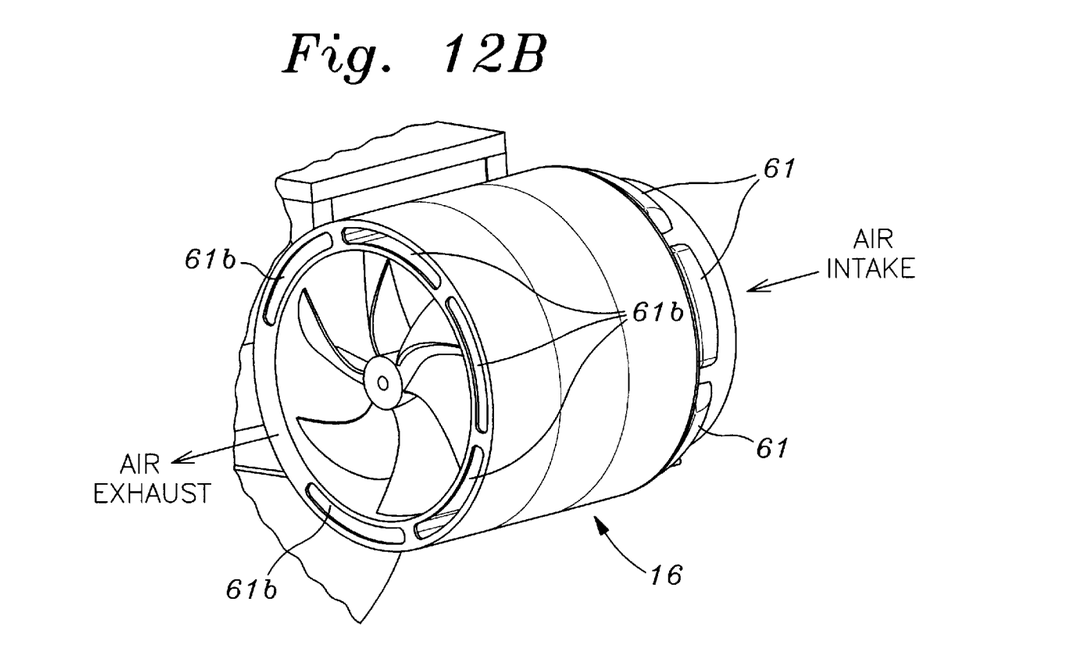
FIG. 12b is a partial rear perspective view of the restrictor housing of FIG. 12a showing one or more by-pass channel exhaust orifices.
Figure 13:
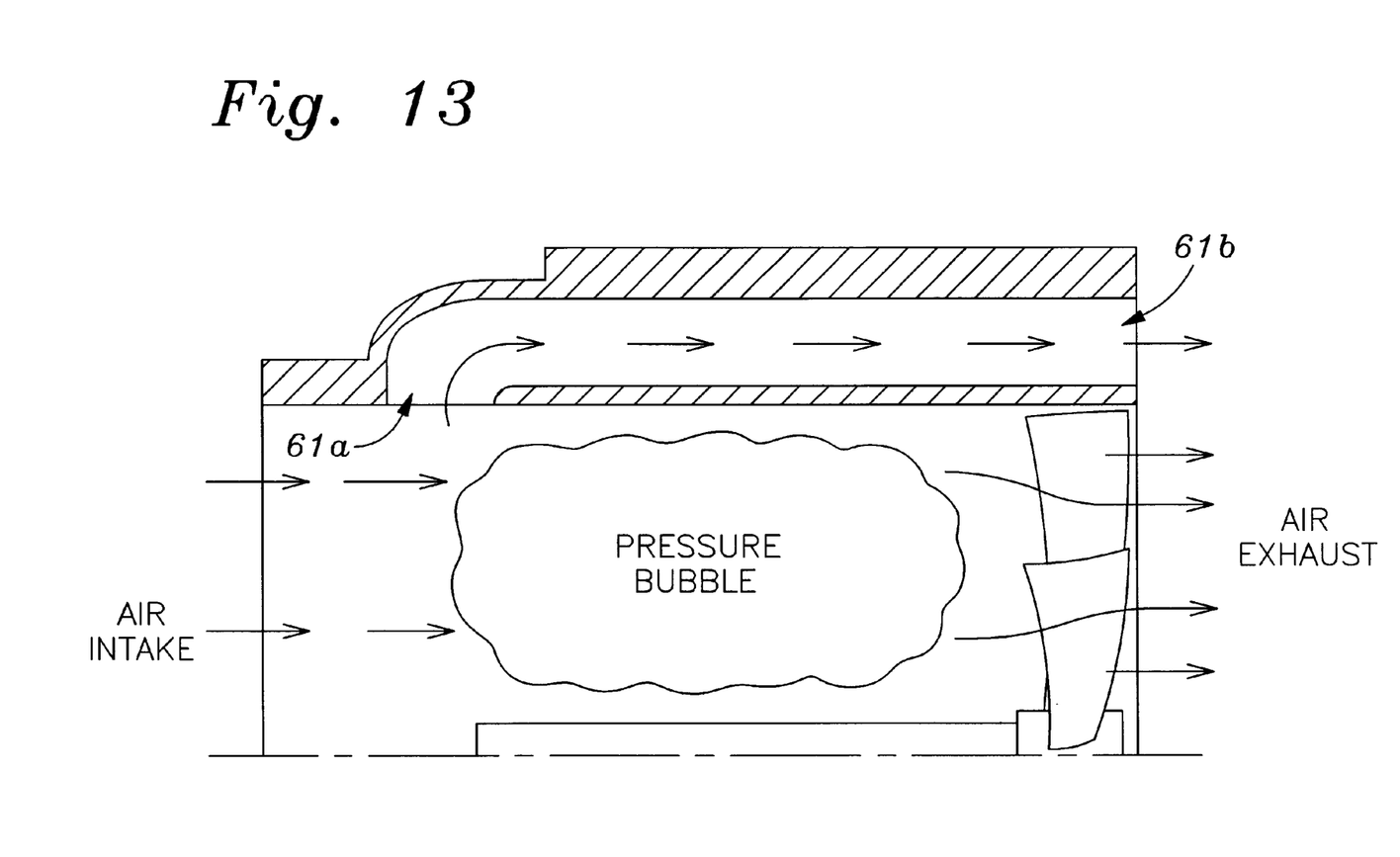
FIG. 13 is an enlarged cross sectional view of the restrictor housing of FIG. 12a illustrating the by-pass channel and airflow pathways.

A critical factor in the operation of the device is how airflow is controlled. Therefore, in a further embodiment of the present invention, the design of the restrictor housings 16 incorporates one or more by-pass channels 61 that enclose or surround the cylindrical restrictor housings 16. The one or more by-pass channels 61 are preferably comprised of outer housings located circumferentially around the cylindrical restrictor housings. The by-pass channels have one or more forward or intake openings 61a, before each impeller, and one or more exit or exhaust openings 61b. The intake openings 61a are located at carefully calculated positions so that when the air pressure builds up in front of the impellers, for example, as a pressure bubble, such as shown in FIG. 13, the excess air pressure will duct or flow around the restrictor housings through the by-pass channels 61, into an exhaust housing. This configuration facilitates air flow through the device with the lowest back pressure or restriction possible.

After air passes through or around the impellers 15, it is expanded in one or more exhaust channels and ducted out of the exhaust or rear openings 45, preferably covered by screens, or the like.

The need to control and minimize aerodynamic forces created by this device is paramount. This device should, in theory, have little effect on the total aerodynamic efficiency of the entire vehicle. So a condition must be created in which, as the airflow passes through the device, no excess back pressure restrictions are placed on that flow. That is, the airflow is controlled and used to optimize total device performance.

The idea behind the one or more by-pass channels is to design the impellers for a certain airflow capacity. Then through testing of the impeller/duct combination finding the optimum flow rate and to locate the by-pass channel intake opening or openings at positions corresponding to the optimum flow rate. This will create what will be referred to as a "pressure bubble", to provide optimum overall performance.

The "pressure bubble" is a term used to describe an aerodynamic condition created in the pressure housing (restrictor) in front of the impeller(s). At low airflow speeds, this pressure is minimal because the impeller(s) is designed to efficiently use a certain amount of airflow. As the vehicle speed increases, the airflow/pressure will increase through the duct. It gradually builds up in front of the impeller(s) to cause aerodynamic drag in the duct. At an aerodynamically efficient location, calculated as described above, the by-pass channel intake openings will be located to allow excess airflow to be routed around the impeller(s), minimizing any additional drag forces. The pressure bubble will be maintained to provide a constant airflow force on the impeller(s), and create a stable operating environment for the device.

Figure 1:
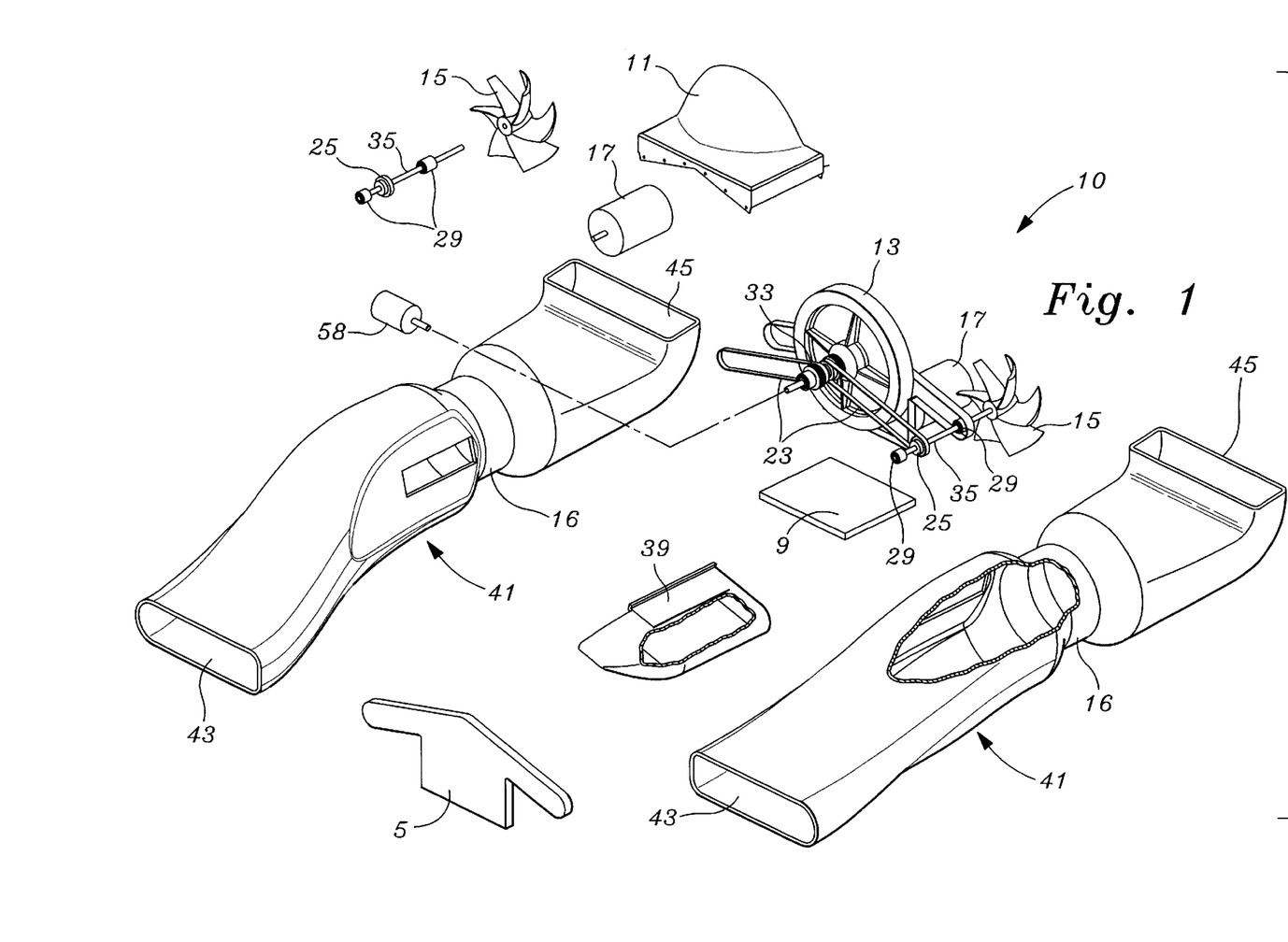
FIG. 1 is a exploded, schematic view of a preferred embodiment of the ram air electrical generator/charging system of the present invention.
Figure 2:
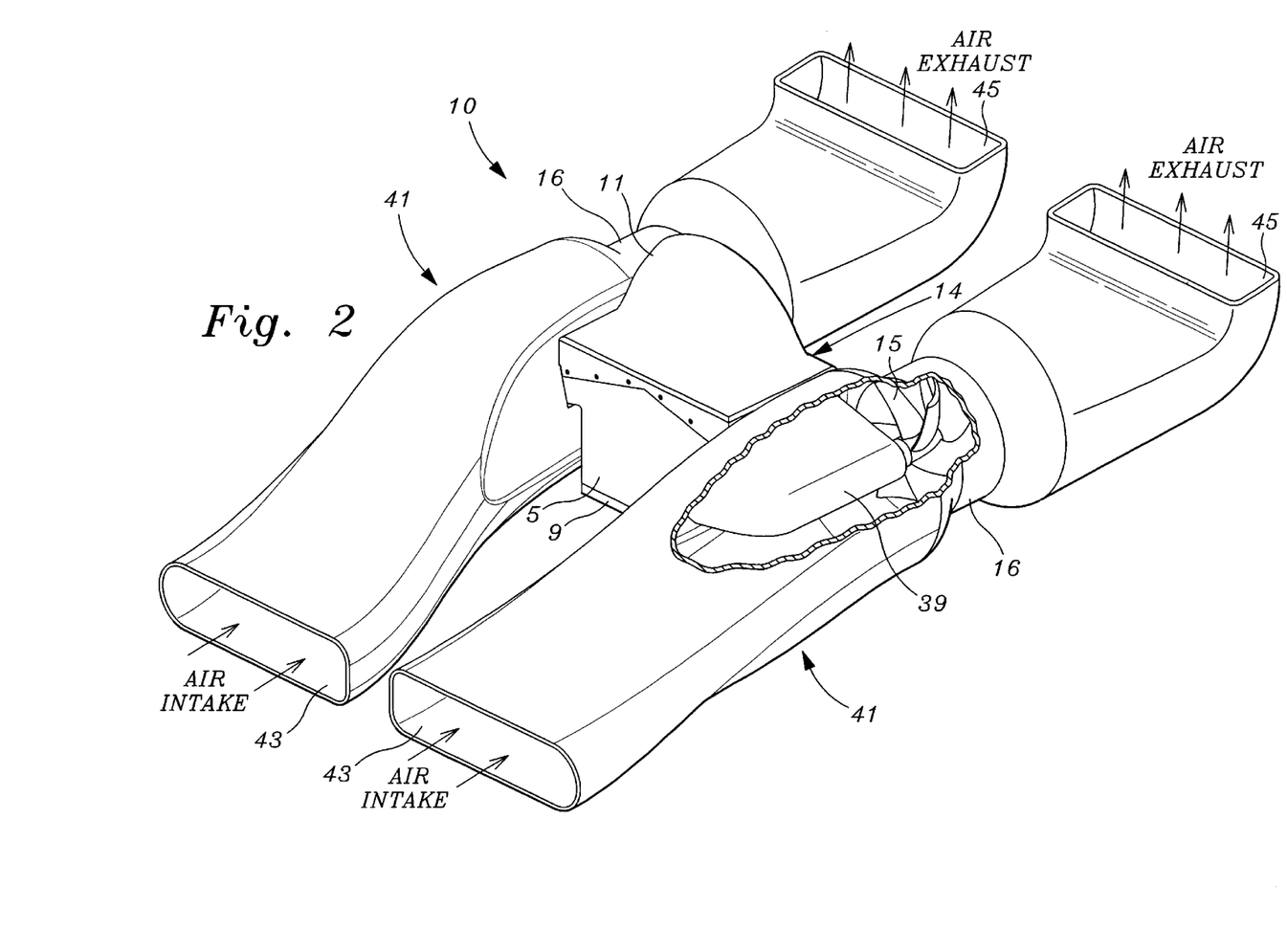
FIG. 2 is a top perspective view, with a portion broken away, of the assembled preferred embodiment of the system of the present invention.
Figure 3:
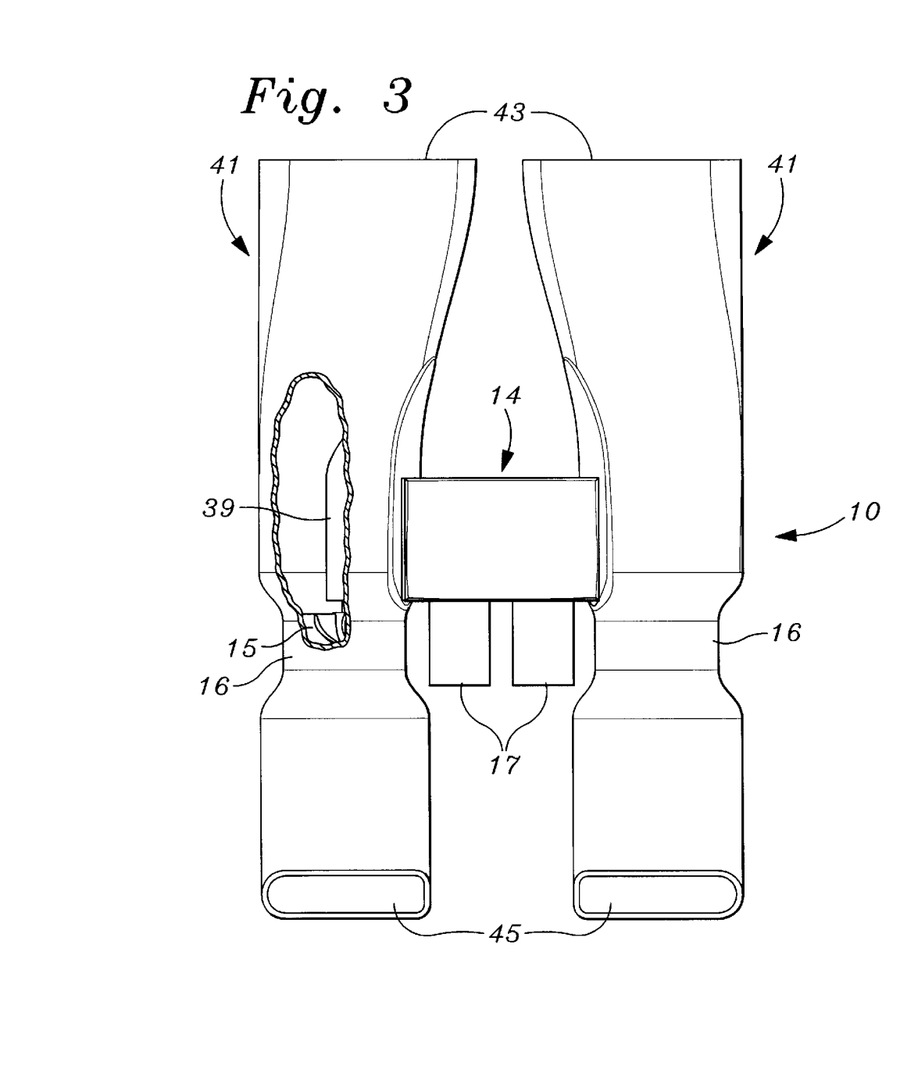
FIG. 3 is a top elevational view of FIG. 2.
Figure 4:
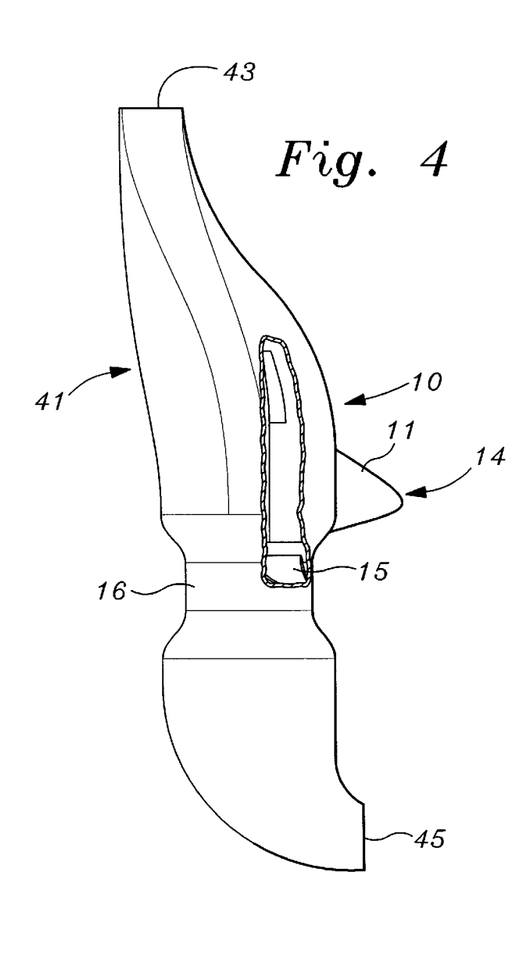
FIG. 4 is a side elevational view of FIG. 2.
Figure 5:
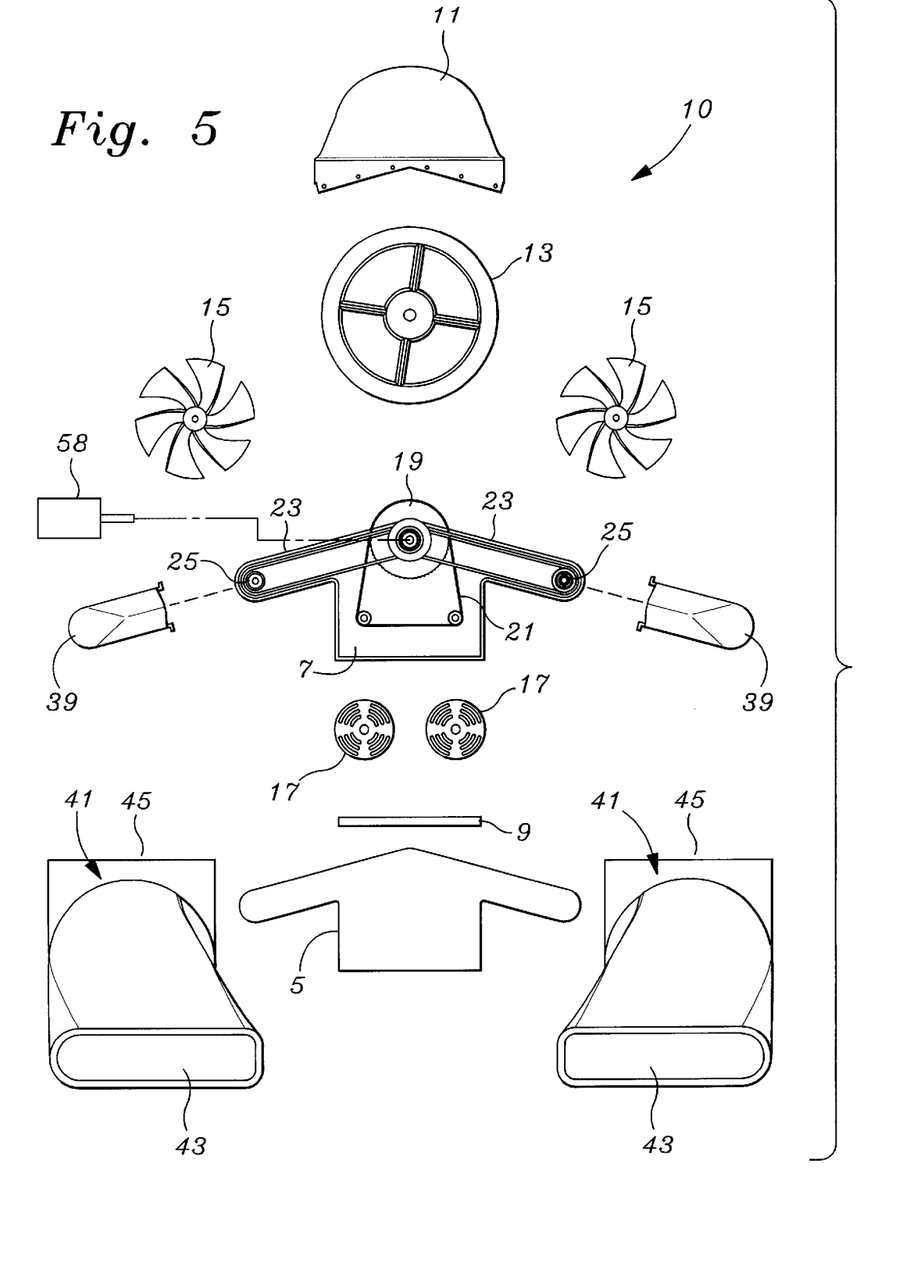
FIG. 5 is an exploded view of the parts of the preferred embodiment of the system of the present invention.
Figure 6:
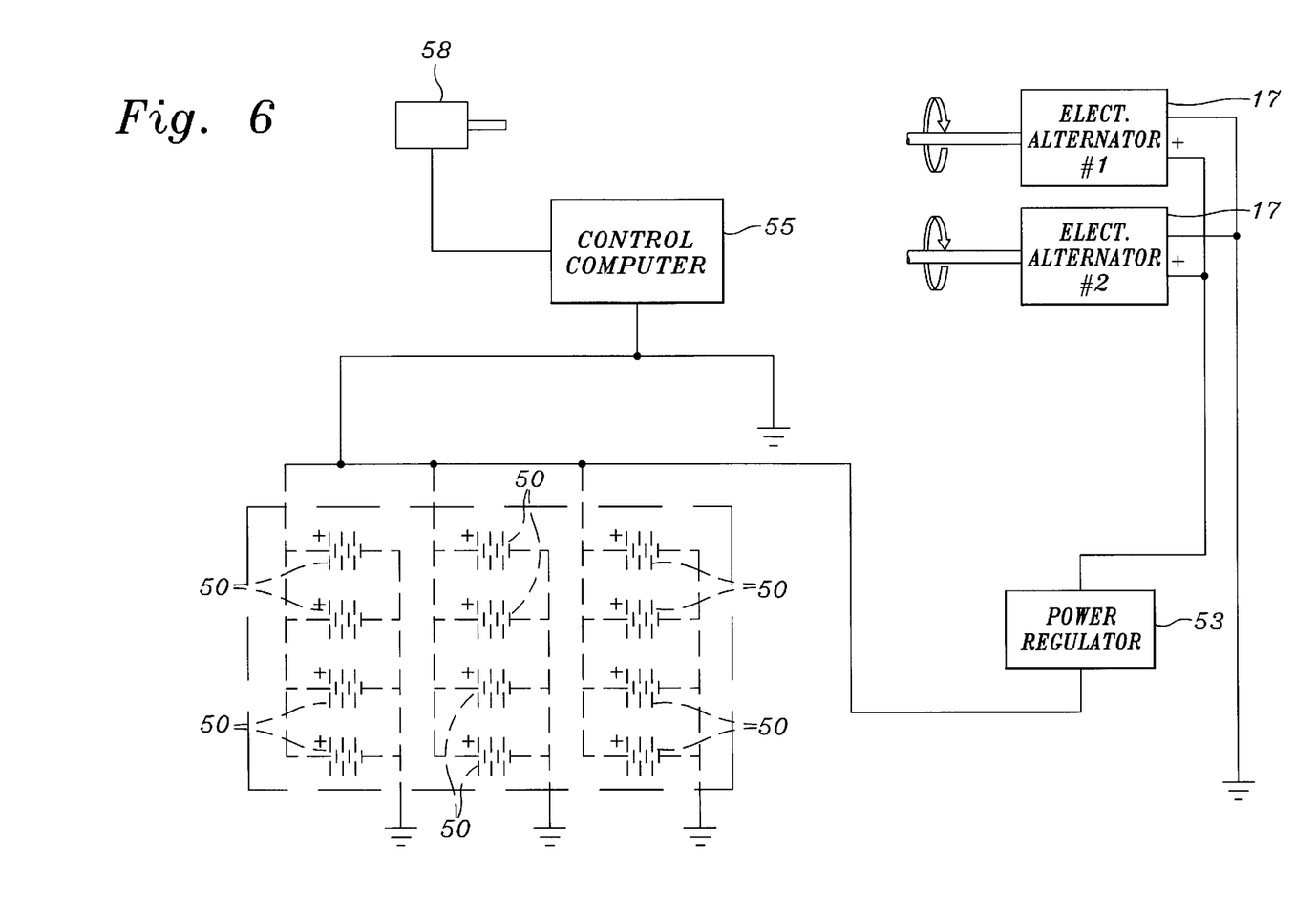
FIG. 6 is a schematic representation of a computer/electrical control circuit of the present invention.

As is best shown in FIG. 6, the electrical control system of the present invention includes a power regulator 53, to control the electricity created by the alternators 17, and to deliver a constant voltage to one or more battery packs 50. All of this is further controlled by the computer control system 55.

Also incorporated in a vehicle with the device of the present invention is every beneficial device currently available, or which come available in the future, to help make this technology feasible. That is, the best batteries available will be utilized, the most powerful/efficient electrical motor to drive the various vehicles, which motor will incorporate regenerative breaking technology, composite materials and an aerodynamically designed vehicle. Other devices, as needed to control and operate the vehicle, are also utilized.

It can thus be seen that the embodiments of the present invention provide easily operated, simplified and improved ram air electrical generator/charging systems for use in an electrical vehicle, and which are incorporated therein to enhance the overall appearance and operation of the vehicle.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An air-driven power generating system for an electrically powered vehicle, comprising, in combination:
    at least one shaped ram air duct;
    at least one reduced diameter housing, fluidly connected to the at least one shaped ram air duct;
    at least one impeller rotatably mounted in the reduced-diameter housing, so as to be rotated by air passing through the at least one shaped ram air duct;
    the at least one shaped impeller operatively connected to a pulley drive system, having at least one impeller drive shaft held in bearings and a pulley connected to a belt to rotate a main drive shaft having a first end and a second end with a driven pulley/freewheel/gear-change combination unit at the first end, a second driven pulley at the second end and a flywheel secured thereon; and
    at least one alternator, driven by the second driven pulley, and the flywheel to charge a battery system.

2. The air-driven power generating system of claim 1 wherein the second driven pulley is operatively connected to the at least one alternator by a belt drive, and the flywheel is connected to the main drive shaft, before the second driven pulley, inside a rear plate of a housing of the pulley drive system.

3. The air-driven power generating system of claim 2 wherein there is a pair of shaped ram air ducts, a pair of reduced-diameter housings, a pair of shaped impellers and a pair of alternators.

4. The air-driven power generating system of claim 3, further including a pair of matched exhausts connected to the reduced-diameter housings after the pair of impellers.

5. An air-driven power generating system for an electrically powered vehicle, comprising, in combination:
    at least one shaped ram air duct;
    at least one reduced diameter housing, fluidly connected to the at least one shaped ram air duct;
    at least one impeller rotatably mounted in the reduced-diameter housing, so as to be rotated by air passing through the at least one shaped ram air duct;
    the at least one shaped impeller operatively connected to a pulley drive system, having at least one impeller drive shaft and a pulley to rotate a main drive shaft having a first driven pulley/freewheel/gear-change combination unit, a second driven pulley and a flywheel secured thereon;
    at least one alternator, driven by the second driven pulley, and the flywheel to charge a battery system; and
    at least one by-pass channel formed around the at least one reduced-diameter housing, and connecting the at least one shaped ram air duct to an exhaust housing.

6. The air-driven power generating system of claim 5 wherein there are a plurality of by-pass channels, and each of the plurality of by-pass channels includes an intake opening in the at least one shaped ram air duct and an exhaust opening in the exhaust housing.

7. An air-driven power generating system for an electrically powered vehicle, comprising, in combination:
    a pair of shaped ram air ducts;
    a pair of shaped reduced-diameter housing, fluidly connected to the pair of shaped ram air ducts;
    a pair of shaped impellers rotatably mounted in the shaped, reduced-diameter housings, so as to be efficiently rotated by air passing through the pair of shaped ram air ducts and the pair of shaped, reduced-diameter housings;

the pair of shaped impellers operatively connected to a pulley drive system, having a plurality of impeller drive shafts mounted on and held in bearings and which include at least one drive pulley having a belt drive to rotate a main drive shaft having a fist end and a second end with a first driven pulley/freewheel/gear-change combination unit at the first end, a second driven pulley at the second end, and a flywheel secured thereon; and a pair of alternators, driven by the second driven pulley, and the flywheel to charge a battery system.

8. The air-driven power generating system of claim 7 wherein the second driven pulley is operatively connected to the pair of alternators by a second belt drive, and the flywheel is connected to the main drive shaft, adjacent the second driven pulley.

9. The air-driven power generating system of claim 8, further including a pair of matched exhausts connected to the reduced-diameter housings after the pair of impellers.

10. An air-driven power generating system for an electrically powered vehicle, comprising, in combination:

a pair of shaped ram air ducts;

a pair of shaped reduced-diameter housings, fluidly connected to the pair of shaped ram air ducts;

a pair of shaped impellers rotatably mounted in the shaped, reduced-diameter housings, so as to be efficiently rotated by air passing through the pair of shaped ram air ducts and the pair of shaped, reduced-diameter housings;

the pair of shaped impellers operatively connected to a pulley drive system, having a plurality of impeller drive shafts and pulleys to rotate a main drive shaft having a first driven pulley/freewheel/gear-change combination unit, a second driven pulley and a flywheel secured thereon;

a pair of alternators, driven by the second driven pulley, and the flywheel to charge a battery system; and at least one by-pass channel formed around the pair of shaped reduced-diameter housings, and connecting the pair of shaped ram air ducts to an exhaust housing.

11. The air-driven power generating system of claim 10 wherein there are a plurality of by-pass channels, and each of the plurality of by-pass channels includes an intake opening in one of the pair of shaped ram air ducts and an exhaust opening in the exhaust housing.

12. An air-driven power generating system for an electrically powered vehicle, comprising, in combination:

a pair of ram air ducts shaped, sized and dimensioned to compress air flowing therethrough;

a pair of reduced-diameter housings, fluidly connected to the pair of ram air ducts to increase the speed of air flowing therethrough;

at least one by-pass channel formed around each of the pair of reduced-diameter housings and connecting the pair of ram air ducts to exhaust housings;

a pair of impellers shaped, sized and dimensioned to efficiently capture the air flow rotatably mounted in the pair of reduced-diameter housings;

the pair of impellers operatively connected to a pulley drive system having a plurality of impeller drive shafts and pulleys to rotate a main drive shaft; the main drive shaft including a first driven pulley/freewheel/gear-change combination unit, a second driven pulley and a flywheel secured thereon; and a pair of alternators, driven by the second driven pulley, and the flywheel to charge a battery pack.

13. The air-driven power generating system of claim 12 wherein the first drive shafts have at least one drive pulley and are mounted and held in bearings, and include a first belt drive to drive the first driven pulley/freewheel/gear-change combination unit, upon rotation of the pair of impellers; and wherein the at least one by-pass channel includes an intake opening formed at a specifically designed area in the pair of ram air ducts.

14. The air-driven power generating system of claim 13 wherein the first driven pulley/freewheel/gear-change combination unit is mounted on the main drive shaft at a first end, with the aft, second driven pulley mounted adjacent the flywheel, which is mounted at a second end of the main drive shaft; and there are a plurality of by-pass channels formed around each of the pair of reduced-diameter housings.

15. The air-driven power generating system of claim 14 wherein the second driven pulley is operatively connected to the pair of alternators by a second belt drive, and the flywheel is connected to the main drive shaft, adjacent the second driven pulley.

16. The air-driven power generating system of claim 15, further including a pair of matched exhausts connected to the reduced-diameter housings in the exhaust housings after the pair of impellers; and wherein each of the plurality of by-pass channels includes an intake opening and an exhaust opening.

* * * * *